(12) United States Patent
Riepold et al.

(10) Patent No.: US 8,386,128 B2
(45) Date of Patent: Feb. 26, 2013

(54) METHOD FOR ADAPTING STEERING CHARACTERISTICS OF A MOTOR VEHICLE

(75) Inventors: Thomas Riepold, Frechen (DE); Salvatore Oliveri, Filsen (DE)

(73) Assignee: Tedrive Holding BV (NL)

( * ) Notice: Subject to any disclaimer, the term of this patent is extended or adjusted under 35 U.S.C. 154(b) by 1099 days.

(21) Appl. No.: 11/777,111

(22) Filed: Jul. 12, 2007

(65) Prior Publication Data

US 2008/0015752 A1   Jan. 17, 2008

(30) Foreign Application Priority Data

Jul. 13, 2006   (DE) .......................... 10 2006 032 682

(51) Int. Cl.
*B62D 6/00* (2006.01)
*B62D 6/04* (2006.01)
*B62D 6/08* (2006.01)
*G06F 17/00* (2006.01)

(52) U.S. Cl. ......................................... 701/41; 180/252
(58) Field of Classification Search .................... 701/41, 701/42, 43, 49; 180/197, 233, 234, 252
See application file for complete search history.

(56) References Cited

U.S. PATENT DOCUMENTS

| 4,837,692 | A | * | 6/1989 | Shimizu | 701/41 |
| 5,481,458 | A | * | 1/1996 | Harara et al. | 701/37 |
| 2010/0161180 | A1 | * | 6/2010 | Yasui et al. | 701/41 |

* cited by examiner

*Primary Examiner* — Thomas Tarcza
*Assistant Examiner* — Edward Pipala
(74) *Attorney, Agent, or Firm* — Cantor Colburn LLP

(57) ABSTRACT

A method for adapting steering characteristics of a motor vehicle with an electric power steering system, including determining of steering angle signals of a steering train utilizing at least one steering angle sensor in the steering train, determining measuring and control quantities of a dynamic drive system, and adapting the steering characteristics based on the steering angle signals and the measuring and control quantities.

10 Claims, 1 Drawing Sheet

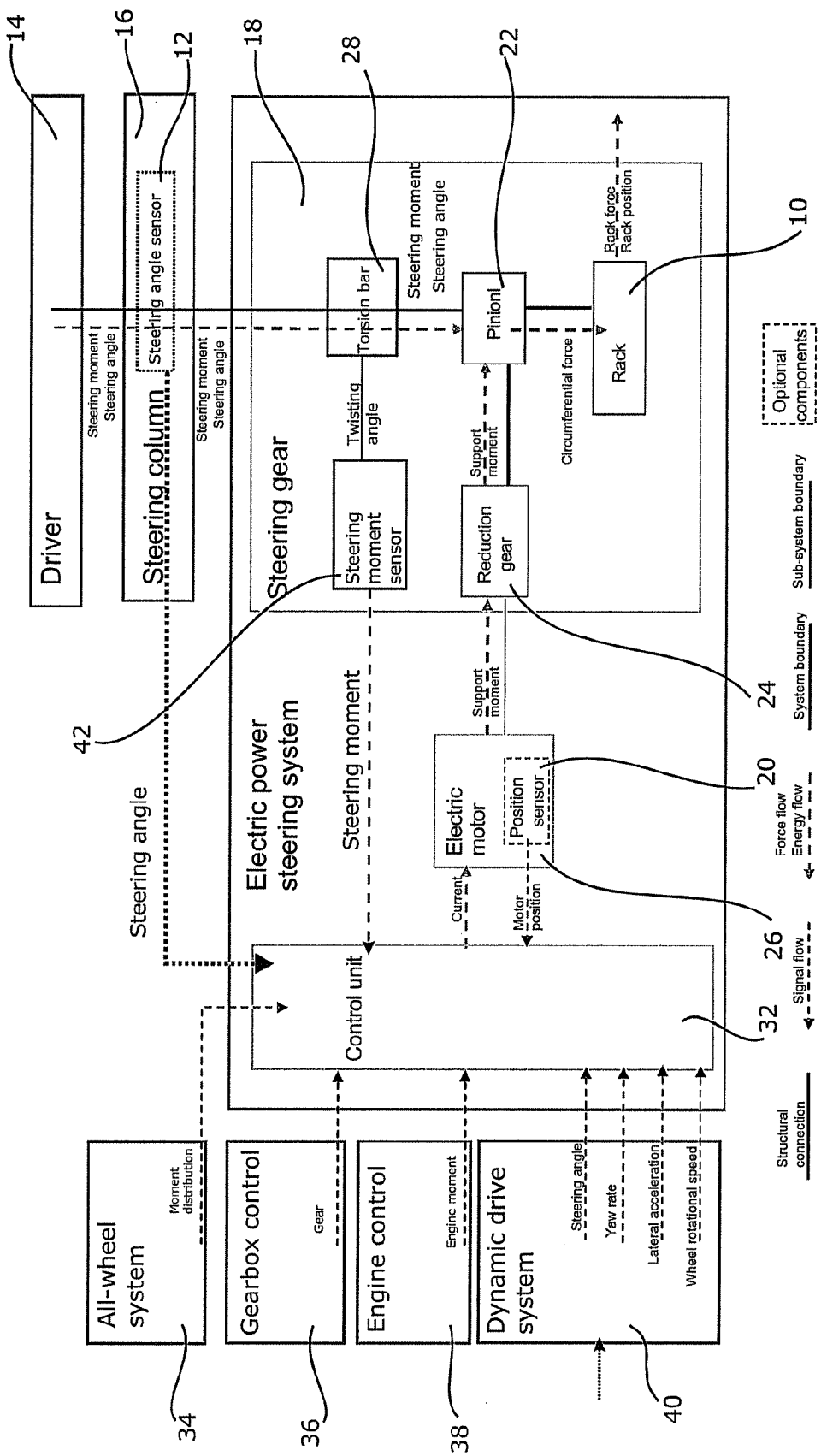

METHOD FOR ADAPTING STEERING CHARACTERISTICS OF A MOTOR VEHICLE

BACKGROUND OF THE INVENTION

1. Field of the Invention

The present invention relates to a method for adapting steering a motor vehicle.

2. Description of Related Art

With a conventional steering system, steerable wheels are steered by a driver via an actuation unit, more preferably through twisting a steering wheel. The rotating of the steering wheel causes a displacement of a rack which in turn pivots the wheels. In power steerings the steering movement of the driver is supported through an additional electric motor. Here, the steering support is generally performed through characteristic-controlled or regulated systems where the steering support is applied as a function of the vehicle speed.

In addition, steering systems are known where no mechanical connection exists between the steerable wheels and the steering wheel (steer by wire). Here, the wheels are pivoted as a function of the rotational speed of the steering wheel with the help of appropriate motors. A substantial problem of these systems consists in that the driver does not receive any perceptible feedback from the wheels any longer.

In addition to influencing the steering behaviour as a function of the speed systems are also known which enable active return of the steered wheels or compensate for side wind. So-called pull/drift compensation methods are also known.

Compensation of drive influences due to the geometry on the steering moment (torque steer) because of uneven-length drive shafts which are described via a fixed correlation between drive moment and steering moment and which go beyond global pull/drift compensation, is absent.

Compensation of drive influences due to the geometry on the steering moment (torque steer) because of the moment distribution of all-wheel systems which are described via a fixed correlation between the distribution of the drive moment to the front wheels and steering moment and which go beyond global pull/drift compensation is likewise absent.

Neither are systems known where compensation of drive influences on the steering moment (torque steer) due to a different distribution of the drive moment to the front wheels, conditional upon different friction values on said front wheels takes place which are described via a fixed correlation between the distribution of the drive moment to the front wheels and steering moment and which go beyond global pull/drift compensation.

Compensation of drive influences on the steering moment (torque steer) due to different distribution of the brake moment on the front wheels conditional on different friction values on said front wheels which are described via a fixed correlation between the distribution of the brake moment to the front wheels and steering moment and which go beyond a global pull/drift compensation is not known either.

Since pull/drift compensation acts permanently and rather globally and unspecifically said pull/drift compensation generally distorts the feedback on the driving state since it also acts when the abovementioned drive influences are absent and it is no longer required.

In principle no systems are known where the steering characteristics are regulated as a function of the condition of the road, the friction value distribution between the wheels (μ-split), the dynamic driving state of the vehicle, more preferably the non-stationary state, the behaviour of the vehicle driver and the route profile.

BRIEF SUMMARY OF THE INVENTION

The invention concerns improving the steering characteristics of a motor vehicle.

According to the invention a method is provided for adapting the steering characteristics of a motor vehicle with an electric power steering system with the process steps: determining steering angle signals of the steering train utilising at least one steering angle sensor in the steering train; determining measuring and control quantities of a dynamic drive system; adapting the steering characteristics based on the steering angle signals and the measuring and control quantities.

According to the invention the steering characteristics of the motor vehicle are adapted or improved taking into account the measuring and control quantities of the dynamic drive system. Here, adapting the stationary and non-stationary characteristic of the dynamic drive system takes place in an advantageous manner as a function of the current driving situation and the condition of the road through permanent determining and evaluating of parameterised measuring and control quantities from the dynamic drive assistance system of the vehicle (e.g. ESP).

Usually modern vehicles are actually equipped with dynamic drive systems which can for example influence the stability of the vehicle. Such a dynamic drive system continuously determines data for driver support. By linking for example slip control, brake and drive stability systems (ABS, ASC, DSC, ESP etc.) one succeeds in increasing the active safety and the driving comfort in this way relieving the driver, they help the driver to safely control his vehicle even in critical situations.

Such systems become active only when for example the tires run the risk of losing adhesion, i.e. before the wheels spin, skid or block. Wheel sensors monitor for instance how fast the wheels rotate during the braking operation. If a wheel tends to block the brake pressure on the corresponding wheel brake cylinder is automatically reduced until the wheel returns to running under normal slip.

With the drive slip control, sensors ensure that the drive power during acceleration is transmitted with minimal slip. Regardless of the position of the accelerator pedal, only so much engine power is permitted as is possible in the current driving situation without spinning wheels. By sensing the wheel speeds through sensors this system recognises if the wheels grip safely. If the driven wheels have a tendency towards spinning, the control intervenes in the engine management and reduces the torque regardless of the current accelerator pedal position.

With the dynamic stability control additional sensors determine additional driving states in order to increase the driving safety during abrupt evasive manoeuvres or sudden danger situations. Expansion of the ABS increases the driving stability particularly when braking in curves. The control system controls the brake pressures below the ABS control threshold through different amounts of braking pressures on the right and left for stabilising counter-acting moments. In addition, dynamic brake management systems are known which support the braking of the driver or for example accelerate the braking operation.

Sensors determine the yaw rate which indicates how fast the vehicle rotates around its normal axis, the lateral acceleration as dimension for curve radius and speed, the steering angle, which indicates the desired direction and the braking pressure exerted by the driver via the pedal as well as the rotational speed of the individual wheels.

The abovementioned embodiments must only be understood exemplarily, dynamic drive data is also determined and utilised from additional systems.

Preferentially the steering sensation is influenced more preferably with regard to compensation such as for instance active return of the wheels to a straight orientation in order to make possible for the driver sensitive sensing and thus an indication of possibly critical driving conditions however without negatively influencing the comfort for example with high friction values. This can mean for example reducing the active return with low friction value of the road surface in order to make possible for the driver sensitive sensing of the driving state, thus reducing his steering work.

Preferentially the adaptation of the steering characteristics are also suitable for the compensation of driving direction interferences which can have various causes. Driving direction interferences occur for example if the drive shafts of the steerable wheels have uneven lengths or if the wheels during acceleration are located on surfaces with different friction values. With the help of the adaptation according to the invention such driving direction interferences which cannot be compensated for to date can be offset in a cost-effective manner.

The compensation of reactions of the drive train due to the geometry on the steering moment (torque steer) due to uneven-length drive shafts which are described via a fixed correlation between drive moment of the combustion engine, gear and steering moment according to the invention takes place through observation and evaluation of the parameterised measuring and control quantities from the drive train of the vehicle. From the engine and gearbox control and evaluation of the known fixed correlations between these and their reaction to the steering or the steering moment a steering moment can be applied, which is in the opposite direction of this reaction. This can take place for example through the evaluation of the engine moment from the engine control and the engaged driving stage from the gearbox control. As a result, these drive influences on the steering characteristics are compensated for and the driving direction interferences caused as a result, avoided. Through intelligent software linkages it is finally possible to convert as it were equal-length drive shafts to uneven-length ones (and vice versa).

Compensation of drive influences due to the geometry on the steering moment (torque steer) based on the moment distribution of all-wheel systems which are described via a fixed correlation between the distribution of the drive moment to the front wheels and the interference moment induced as a result, is possible.

Through observing and evaluating the parameterised measuring and control quantities from the drive train of the vehicle, i.e. the engine and gearbox control and the control of the all-wheel system and evaluation of the known correlations between these and their reaction to the steering or the steering moment a steering moment is applied which is in the opposite direction to this reaction so that the driving direction interferences caused as a result are avoided.

This can take place through the evaluation of the engine moment from the engine control, the engaged driving stage from the gearbox control and the moment distribution from the control of the all-wheel system, through which these influences from the all-wheel system on the steering characteristics and the driving direction interferences caused as a result, can be compensated for.

Compensation of drive influences on the steering moment (torque steer) due to different distribution of the drive moments to the front wheels due to different road friction values on said front wheels which are described via a fixed correlation between the friction value induced distribution of the drive moment to the front wheels and the steering moment, is likewise possible.

Through observing and evaluating the parameterised measuring and control quantities from the drive train of the vehicle, i.e. the engine and gearbox control and the control of the all-wheel system and evaluation of the known correlations between these and their reaction to the steering or the steering moment a steering moment is applied which is in the opposite direction to this reaction and compensates for the driving direction interferences caused as a result.

This can take place through the evaluation of the engine moment from the engine control, the engaged driving stage from the gearbox control and the wheel rotational speeds from the dynamic drive system. By evaluating the wheel rotational speeds as function of the steering angle the slip on the front wheels and thus the distribution of the drive moment to said front wheels can be calculated and these influences of different road friction values on the front wheels on the steering characteristics and the driving direction interferences caused by this can be compensated for.

Finally, compensation of the influences of the distribution of the brake force on the steering characteristics due to different and transient distribution of the road friction values on the wheels which are described through a correlation with the friction value induced distribution of the brake force (μ-split braking, transient μ braking) can be achieved.

Through continuous monitoring and evaluation of the parameterised measuring and control quantities from the ABS and dynamic drive system and evaluation of the known correlations between these and their reaction to the steering characteristics a steering moment is applied which is in the opposite direction of this reaction and which compensates for the driving direction interferences caused by this.

This can take place through the evaluation of the wheel rotational speeds and brake pressures from the ABS and dynamic drive system respectively. By evaluating the wheel rotational speeds as a function of the steering angle the slip on the front wheels and thus the distribution of the braking force to said front wheels can take place.

As a result, these influences of different road friction values on the front wheels on the steering characteristics and the driving direction interferences caused through this are compensated for.

The method is particularly advantageous also when it also takes into account the current driving state, the behaviour of the vehicle driver and the route profile. For example, the active return, the damping etc. can be adapted to the driving situation and clear feedback for example concerning critical driving states can be given to the driver without having a negative influence on comfort. As explained, this can mean a reduction of the active return of the steerable wheels, the damping or other compensations on a curvy road, but adaptation to poor, uneven or smooth roads or many or few curves for example is also conceivable. Here adaptation preferably takes place for example by way of lateral accelerations or the use of the brake pedal or frequency and force of the use being determined and recorded. On a curvy route the steering or the chassis can then be individually adapted. Adaptation can also take place when for example the accelerator pedal is actuated frequently and rapidly and the driver is obviously interested in fast acceleration. In this case it is also practical if the steering characteristics of the vehicle are tightened up.

Preferentially data of a position sensor of the electric motor which supports the steering can also be utilised. More preferably brushless electric motors for example are suitable for this purpose.

BRIEF DESCRIPTION OF THE DRAWING

The invention is explained in more detail by means of the only FIGURE which shows a schematic representation of a safety monitoring system of the operating behaviour. The exemplary embodiment shown serves only as an example and not to restrict the invention.

DETAILED DESCRIPTION OF THE INVENTION

As can be seen from the associated legend a structural connection, signal flow or force flow or energy flow is possible between the shown components. In addition, system boundaries and sub-system boundaries are represented through different line strengths.

A driver 14 applies a steering moment to a steering gear 18 via a steering column 16. The steering gear 18 has a pinion 22 via which the steering moment is transmitted to the rack 10. Optionally the steering column 16 can have a steering angle sensor 12 according to the state of the art. Alternatively the steering angle sensor 12 can also be arranged in the steering gear 18 or on the rack 10.

The auxiliary moment is generated by an electric motor 26 and transmitted to the rack via a reduction gear 24. The electric motor 26 which supports the rotation of the steering train or a displacement of a rack which pivots the wheels can include a position sensor 20, from which the current position of the wheels or the steering angle can be deducted. Either the steering angle sensor 12 and the position sensor 20 can be provided, but one of the components can be sufficient.

In addition, the steering gear 18 can have a torsion bar 28. Via the torsion bar it is possible to determine a steering moment acting on the steering gear 18 with the help of a steering moment sensor 42.

The values determined through the position sensor 20 are transmitted to a control unit 32. The electric motor 26 is controlled via the control unit 32, thus determines among other things the optimum support moment for the reduction gear 24.

In the exemplary embodiment shown a determined moment distribution of an all-wheel system 34, the determined gear that is engaged of a gear control 36, the determined engine moment of an engine control 38, as well as the steering angle, the yaw rate, the lateral acceleration and the wheel rotational speeds each determined by a dynamic drive system 40 are also transmitted to the control unit 32. In addition, the control unit 32 receives the steering angle determined from the steering angle sensor 12. In addition, the control unit 32 receives the steering moment acting on the steering gear 18 from the steering moment sensor 42.

The invention is not restricted to the exemplary embodiment described but rather comprises all embodiments having the same effect.

The invention claimed is:

1. A method for adapting steering characteristics of a motor vehicle with an electric power steering system, comprising:
   determining steering angle signals of a steering train utilizing at least one steering angle sensor in the steering train;
   determining measurement and control variables of a dynamic drive system, which observes and evaluates parameterized measurement and control variables from a drive train of the motor vehicle;
   adapting the steering characteristics on a basis of the steering angle signals and the measurement and control variables,
   wherein the steering characteristics comprise active return of wheels of the motor vehicle, wherein said active return is adapted as a function of the determined steering angle signals and as a function of the measurement and control variables,
   and wherein the measurement and control variables and a known fixed correlation between these and their reaction to a steering moment are evaluated and another steering moment is applied in an opposite direction to the reaction during straight driving, turns and braking.

2. The method according to claim 1, wherein the measurement variables comprise road condition and are determined and used in the adaptation of the steering characteristics.

3. The method according to claim 1, wherein the active return with a low friction value of the road is less than with a high friction value.

4. A method for adapting steering characteristics of a motor vehicle with an electric power steering system, comprising:
   determining steering angle signals of a steering train utilizing at least one steering angle sensor in the steering train;
   determining measurement and control variables of a dynamic drive system, which observes and evaluates parameterized measurement and control variables from a drive train of the motor vehicle;
   adapting the steering characteristics on a basis of the steering angle signals and the measurement and control variables; and
   compensating for driving direction interferences due to uneven-length drive shafts by evaluating an engine moment and an engaged gear and a known fixed correlation between these and their reaction to a steering moment and by applying another steering moment in an opposite direction to the reaction during straight driving, turns and braking.

5. A method for adapting steering characteristics of a motor vehicle with an electric power steering system, comprising:
   determining steering angle signals of a steering train utilizing at least one steering angle sensor in the steering train;
   determining measurement and control variables of a dynamic drive system;
   adapting the steering characteristics on a basis of the steering angle signals and the measurement and control variables; and
   taking into account previously determined and recorded measuring data with regard to a previously travelled route, the measuring data being reflective of lateral accelerations, determinations and recordings of frequency and force of a use of a brake pedal and frequencies of accelerator pedal actuation during straight driving, turns and braking.

6. A method for adapting steering characteristics of a motor vehicle with an electric power steering system, comprising:
   determining steering angle signals of a steering train utilizing at least one steering angle sensor in the steering train;
   determining measurement and control variables of a dynamic drive system;
   adapting the steering characteristics on a basis of the steering angle signals and the measurement and control variables; and
   taking into account a previously determined and recorded driving behaviour of a driver of the motor vehicle, the driving behaviour including lateral accelerations, determinations and recordings of frequency and force of a use of a brake pedal and frequencies of accelerator pedal actuation during straight driving, turns and braking.

7. The method according to claim 1, wherein angle signals of a position sensor of an electric motor which supports the steering are determined and used in the adaptation of the steering characteristics.

8. The method according to claim 1, wherein the measurement and control variables comprise at least one or more of a rotational speed of a wheel of the vehicle, a pressure exerted by a driver onto a brake pedal of the vehicle, a yaw rate of the vehicle and a longitudinal or lateral acceleration of the vehicle.

9. A method of controlling a motor vehicle with an electric power steering system, comprising:
   determining a steering angle signal of a steering train utilizing at least one steering angle sensor;
   determining measurement and control variables of a dynamic drive system; and
   adapting steering characteristics of the electric power steering system based on the determined steering angle signal and the determined measurement and control variables while at least one of:
   compensating for driving direction interferences due to uneven-length drive shafts, or accounting for measuring data regarding a previously travelled route during straight driving, turns and braking.

10. A method of controlling a motor vehicle with an electric power steering system, comprising:
   determining a steering angle signal of a steering train utilizing at least one steering angle sensor;
   determining measurement and control variables of a dynamic drive system; and
   adapting steering characteristics of the electric power steering system based on the determined steering angle signal and the determined measurement and control variables while at least one of:
   compensating for driving direction interferences by accounting for measuring data regarding a previously travelled route in accordance with lateral accelerations, braking or frequency and force of the breaking being determined and recorded during straight driving, turns and braking.

* * * * *